(12) United States Patent
Morten

(10) Patent No.: US 7,356,143 B2
(45) Date of Patent: **\*Apr. 8, 2008**

(54) SYSTEM, METHOD, AND APPARATUS FOR SECURELY PROVIDING CONTENT VIEWABLE ON A SECURE DEVICE

(75) Inventor: Glenn A. Morten, Bellevue, WA (US)

(73) Assignee: Widevine Technologies, Inc, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/361,469

(22) Filed: Feb. 24, 2006

(65) Prior Publication Data

US 2006/0143481 A1    Jun. 29, 2006

Related U.S. Application Data

(63) Continuation-in-part of application No. 11/319,255, filed on Dec. 27, 2005, which is a continuation of application No. 10/760,642, filed on Jan. 20, 2004, now Pat. No. 7,007,170.

(60) Provisional application No. 60/455,723, filed on Mar. 18, 2003.

(51) Int. Cl.
*H04N 7/167* (2006.01)

(52) U.S. Cl. ............... 380/201; 713/193; 713/194; 380/45; 380/281; 380/282; 380/284

(58) Field of Classification Search ............... None
See application file for complete search history.

(56) References Cited

U.S. PATENT DOCUMENTS 4,535,355 A * 8/1985 Arn et al. ............... 380/212

(Continued)

FOREIGN PATENT DOCUMENTS

EP    658054 B1    6/1995

(Continued)

OTHER PUBLICATIONS

"Selective Encryption and Watermarking of MPEG Video" (Wu et al. dated Feb. 17, 1997).*

(Continued)

*Primary Examiner*—Emmanuel L. Moise
*Assistant Examiner*—Nadia Khoshnoodi
(74) *Attorney, Agent, or Firm*—Darby & Darby P.C.; Jamie L. Wiegand

(57) ABSTRACT

A system, apparatus, and method are directed to providing and securely viewing secure content. In one embodiment, a secure player provides secure screening/previewing of secure content, such as a motion picture, by a member of an awards organization. A content key is employed to selectively encrypt at least a portion of a content stream. The content key is encrypted with a screener key. The encrypted content key is embedded into the secure content. The screener key is encrypted using public/private key pair that is bound to the secure player. The secure content may be distributed on a medium, such as a DVD, high definition DVD, or over a network, or the like. The secure player is configured to receive the medium, screener key, and a screener identity. The screener identity and screener key are employed by the secure player to decrypt and enable secure viewing of the content.

23 Claims, 7 Drawing Sheets

U.S. PATENT DOCUMENTS

| | | |
|---|---|---|
| 4,694,489 A | 9/1987 | Frederiksen |
| 5,067,035 A | 11/1991 | Kudelski et al. |
| 5,134,656 A | 7/1992 | Kudelski |
| 5,144,663 A | 9/1992 | Kudelski et al. |
| 5,375,168 A | 12/1994 | Kudelski |
| 5,539,450 A | 7/1996 | Kudelski et al. |
| 5,590,200 A | 12/1996 | Nachman et al. |
| 5,592,212 A | 1/1997 | Kudelski et al. |
| 5,621,799 A | 4/1997 | Katta et al. |
| 5,640,546 A | 6/1997 | Gopinath et al. |
| 5,666,412 A | 9/1997 | Handelman et al. |
| 5,684,876 A | 11/1997 | Pinder et al. |
| 5,758,257 A | 5/1998 | Herz et al. |
| 5,774,527 A | 6/1998 | Handelman et al. |
| 5,774,546 A | 6/1998 | Handelman et al. |
| 5,799,089 A | 8/1998 | Kuhn et al. |
| 5,805,705 A | 9/1998 | Gray et al. |
| 5,870,474 A | 2/1999 | Wasilewski et al. |
| 5,878,134 A | 3/1999 | Handelman et al. |
| 5,883,957 A | 3/1999 | Moline et al. |
| 5,892,900 A | 4/1999 | Ginter et al. |
| 5,910,987 A | 6/1999 | Ginter et al. |
| 5,915,019 A | 6/1999 | Ginter et al. |
| 5,917,912 A | 6/1999 | Ginter et al. |
| 5,920,625 A | 7/1999 | Davies |
| 5,920,861 A | 7/1999 | Hall et al. |
| 5,922,208 A | 7/1999 | Demmers |
| 5,923,666 A | 7/1999 | Gledhill et al. |
| 5,933,498 A | 8/1999 | Schneck et al. |
| 5,939,975 A | 8/1999 | Tsuria et al. |
| 5,943,422 A | 8/1999 | Van Wie et al. |
| 5,949,876 A | 9/1999 | Ginter et al. |
| 5,982,891 A | 11/1999 | Ginter et al. |
| 5,991,399 A * | 11/1999 | Graunke et al. ............ 380/279 |
| 6,009,116 A | 12/1999 | Bednarek et al. |
| 6,009,401 A | 12/1999 | Horstmann |
| 6,009,525 A | 12/1999 | Horstmann |
| 6,021,197 A | 2/2000 | von Willich et al. |
| 6,035,037 A | 3/2000 | Chaney |
| 6,038,433 A | 3/2000 | Vegt |
| 6,049,671 A | 4/2000 | Slivka et al. |
| 6,055,503 A | 4/2000 | Horstmann |
| 6,073,256 A | 6/2000 | Sesma |
| 6,112,181 A | 8/2000 | Shear et al. |
| 6,138,119 A | 10/2000 | Hall et al. |
| 6,141,753 A | 10/2000 | Zhao et al. |
| 6,157,721 A | 12/2000 | Shear et al. |
| 6,160,891 A | 12/2000 | Al-Salqan |
| 6,178,242 B1 | 1/2001 | Tsuria |
| 6,185,683 B1 | 2/2001 | Ginter et al. |
| 6,189,097 B1 | 2/2001 | Tycksen, Jr. et al. |
| 6,191,782 B1 | 2/2001 | Mori et al. |
| 6,226,618 B1 | 5/2001 | Downs et al. |
| 6,226,794 B1 | 5/2001 | Anderson, Jr. et al. |
| 6,237,786 B1 | 5/2001 | Ginter et al. |
| 6,240,185 B1 | 5/2001 | Van Wie et al. |
| 6,247,950 B1 | 6/2001 | Hallam et al. |
| 6,253,193 B1 | 6/2001 | Ginter et al. |
| 6,256,668 B1 | 7/2001 | Slivka et al. |
| 6,272,636 B1 | 8/2001 | Neville et al. |
| 6,285,985 B1 | 9/2001 | Horstmann |
| 6,292,569 B1 | 9/2001 | Shear et al. |
| 6,298,441 B1 | 10/2001 | Handelmann et al. |
| 6,314,409 B2 | 11/2001 | Schneck et al. |
| 6,314,572 B1 | 11/2001 | LaRocca et al. |
| 6,334,213 B1 | 12/2001 | Li |
| 6,363,488 B1 | 3/2002 | Ginter et al. |
| 6,389,402 B1 | 5/2002 | Ginter et al. |
| 6,405,369 B1 | 6/2002 | Tsuria |
| 6,409,080 B2 | 6/2002 | Kawagishi |
| 6,409,089 B1 * | 6/2002 | Eskicioglu ................. 235/492 |
| 6,415,031 B1 | 7/2002 | Colligan et al. |
| 6,427,140 B1 | 7/2002 | Ginter et al. |
| 6,449,367 B2 | 9/2002 | Van Wie et al. |
| 6,449,719 B1 | 9/2002 | Baker |
| 6,459,427 B1 | 10/2002 | Mao et al. |
| 6,466,670 B1 | 10/2002 | Tsuria et al. |
| 6,505,299 B1 | 1/2003 | Zeng et al. |
| 6,587,561 B1 | 7/2003 | Sered et al. |
| 6,618,484 B1 | 9/2003 | Van Wie et al. |
| 6,629,243 B1 | 9/2003 | Kleinman et al. |
| 6,634,028 B2 | 10/2003 | Handelmann |
| 6,640,304 B2 | 10/2003 | Ginter et al. |
| 6,651,170 B1 | 11/2003 | Rix |
| 6,654,420 B1 | 11/2003 | Snook |
| 6,654,423 B2 | 11/2003 | Jeong et al. |
| 6,658,568 B1 | 12/2003 | Ginter et al. |
| 6,668,325 B1 | 12/2003 | Collberg et al. |
| 6,792,113 B1 | 9/2004 | Ansell et al. |
| 2002/0001385 A1* | 1/2002 | Kawada et al. ............. 380/201 |
| 2002/0015498 A1* | 2/2002 | Houlberg et al. ........... 380/277 |
| 2002/0021805 A1* | 2/2002 | Schumann et al. ......... 380/201 |
| 2002/0049679 A1 | 4/2002 | Russell et al. |
| 2002/0089410 A1* | 7/2002 | Janiak et al. ............... 340/5.53 |
| 2002/0104004 A1* | 8/2002 | Couillard .................... 713/178 |
| 2002/0108037 A1 | 8/2002 | Baker |
| 2002/0141582 A1* | 10/2002 | Kocher et al. .............. 380/201 |
| 2003/0007568 A1 | 1/2003 | Hamery et al. |
| 2003/0046568 A1 | 3/2003 | Riddick et al. |
| 2004/0117500 A1 | 6/2004 | Lindholm et al. |
| 2004/0151315 A1* | 8/2004 | Kim ........................... 380/241 |
| 2004/0184616 A1 | 9/2004 | Morten |
| 2005/0193205 A1* | 9/2005 | Jacobs et al. ............... 713/176 |
| 2005/0273862 A1 | 12/2005 | Benaloh et al. |

FOREIGN PATENT DOCUMENTS

| | | |
|---|---|---|
| EP | 714204 B1 | 5/1996 |
| EP | 0886409 * | 12/1998 |
| EP | 886409 A2 * | 12/1998 |
| EP | 1246463 | 10/2002 |
| WO | WO-96/06504 A1 | 2/1996 |
| WO | WO-96/32702 A1 | 10/1996 |
| WO | WO-99/30499 A1 | 6/1999 |
| WO | WO-99/54453 A1 | 10/1999 |
| WO | WO-01/35571 A1 | 5/2001 |
| WO | WO 0193212 * | 12/2001 |
| WO | WO 0193212 A2 * | 12/2001 |
| WO | WO-02/21761 A2 | 3/2002 |

OTHER PUBLICATIONS

"Establishing Interconnectivity among Various Makers' Products through Standardizatin of VOD Protocol", NTT Corporation Press Release, Sep. 27, 2002. http://www.ntt.co.jp/news/news02e/0209/020927.html.

"Irdeto Access & Optibase create Strategic Alliance", Press Release, Optibase, pp. 1-2, Dec. 14, 2000. http://www.optibase.com/html/news/December_14_2000.html.

"Irdeto Access & Optibase create Strategic Alliance", Press Release, Optibase, pp. 1-4, Dec. 14, 2000. http://www.irdetoaccess.com/press/0000041.htm.

Balthrop, Justin, et al., "Coverage and Generalization in an Artificial Immune System", Proceedings of Genetic and Evolutionary Computation Conference (GECCO), pp. 1-8, 2002.

Blumenfeld, Steven, "System Security, Streaming Media", Broadcast Engineering magazine, pp. 1-2, Oct. 2001.

Cheng, H.C.H., "Partial Encryption for Image and Video Communication", Department of Computing Science, University of Alberta, pp. 1-87, Fall, 1998.

Eskiciouglu, A. and Delp, E., "An overview of multimedia content protection in consumer electronics devices", SP:IC, 16(7): pp. 681-699, Apr. 2001.

Fairhurst, Gorry, "Manchester Encoding", pp. 1-2, Jan. 1, 2006. Was visited on Jun. 13, 2006. http://www.erg.abdn.ac.uk/users/gorry/course/phy-pages/man.html.

Fairhurst, Gorry, Non-Return to Zero (NRZ) Encoding, 1 page, Jan. 10, 2001. Was visited on Jun. 13, 2006. http://erg.abdn.ac.uk/users/gorry/course/phy-pages/nrz.html.

Forrest, S., "Research Projects", pp. 1-3, Dec. 2, 2003. http://www.cs.unm.edu/~forrest/projects.html.

Friedman, Manahem and Kandel, Abraham, "Introduction to Pattern Recognition: Statistical, Structural, Neural and Fuzzy Logic Approaches", Library of Congress Cataloging-in-Publication Date, 1999, p. 4.

Griwodz, Carsten, "Video Protection by Partial Content Corruption", Multimedia and Security Workshop at ACM Multimedia, Bristol, UK, pp. 1-5, Sep. 1998.

Hunter, J., et al., "A Review of Video Streaming Over the Internet", DSTC Technical Report TR97-10, pp. 1-28., Aug. 1997.

Intelligent Systems for Finance and Business, Goonatilake, Suran, ed. et al., Chapters 2-10, pp. 31-173, 1995.

Omneon Video Networks Product Announcement, "Broadband Streaming Omneon and BSkyB", TB-1006-1, pp. 1-4.

Schulzrinne, H., et al., Real Time Streaming Protocol (RTSP), RFC 2326, pp. 1-86, Apr. 1998.

Spanos, George, et al., "Performance Study of a Selective Encryption Scheme for the Security of Networked, Real-Time Video", Proceedings of the 4th ICCN, Las Vegas, NV, pp. 2-10, Sep. 1995.

Yoshida, Kazuhiro, et al., "A Continuous-media Communication Method for Minimizing Playback Interruptions", IS&T/SPIE Conference on Visual Communications and Immage Processing, Jan. 1999, San Jose, California, vol. 3653.

Zhang, Jian, et al., "A Flexible Content Protection System for Media-On-Demand", Multimedia Software Engineering, 2002, Proceedings, Fourth International Symposium on Dec. 11-13, 2002, Piscataway, NJ, Dec. 11, 2002, pp. 272-277.

Telxeira, L.M., et al., "Secure Transmission of MPEG Video Sources", Proceedings of IEEE Workshop on ISPACS, Nov. 6, 1998, pp. 1-5.

Kirovski, D., et al, "Digital Rights Management for Digital Cinema", Proceedings of the SPIE, Bellingham, VA, vol. 4472, Jul. 31, 2001, p. 105-120.

Supplementary European Search Report dated Nov. 8, 2006 issued for corresponding European Patent Application No. 04757582.

* cited by examiner

SYSTEM, METHOD, AND APPARATUS FOR SECURELY PROVIDING CONTENT VIEWABLE ON A SECURE DEVICE

CROSS REFERENCE TO RELATED APPLICATIONS

This application is a Continuation-In-Part patent application of U.S. patent application Ser. No. 11/319,255, filed Dec. 27, 2005, which is a Continuation application from U.S. patent application Ser. No. 10/760,642, filed Jan. 20, 2004, now U.S. Pat. No. 7,007,170 and claims the benefit under 35 U.S.C. §120 of each, which in turn claims the benefit of U.S. Provisional Application Ser. No. 60/455,723, filed Mar. 18, 2003, the benefit of which is hereby claimed under 35 U.S.C. §119 (e), and wherein each application is further incorporated herein by reference.

FIELD OF THE INVENTION

The present invention relates to data security, and more particularly, to a system, and method, and apparatus for providing and securely playing secure content.

BACKGROUND OF THE INVENTION

Digital Versatile Discs (DVDs) are potentially the fastest growing and most rapidly adopted consumer electronics product of today. Interestingly, one of the main reasons that the DVD format is so innovative and attractive to consumers and the entertainment industry is exactly what makes it potentially vulnerable to illicit copying. Because DVDs store movies in a digital format that is perfectly reproducible every time movies are recorded and played on DVDs, for the first time one can view movies at home with crystal clarity and high quality audio. Additionally, the fact that the movies are stored digitally also means it is possible for movie companies, and others, to make virtually an infinite number of essentially perfect copies of DVD movies.

Such quality and ease of reproduction has made it extremely convenient for movie companies, for example, to send out thousands of pristine copies of first edition movies to members of the Academy of Motion Picture Arts and Sciences. These DVDs typically are intended to be viewed only by those individuals who vote for Oscars and other industry awards. However, many of the DVDs have fallen into unauthorized hands and have become the digital blueprint for bootleggers who have copied the DVDs and distributed them both online and in shops abroad. Many such films then show up in pirated DVD form, or the like, shortly after their release into the theaters—and sometimes sooner. Since it is preferable to continue to use a high quality digital medium, such as DVDs, to distribute motion pictures, providing a relatively high level of security to protect the content is desirable. Unfortunately, the illicit copies are of such high quality that movie companies, or the like often lose millions of dollars as a result. In addition, many other content owners in the entertainment industry remain reluctant to provide content on DVDs until such content protection is available. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Preferred Embodiment, which is to be read in association with the accompanying drawings, wherein.

DETAILED DESCRIPTION OF THE PREFERRED EMBODIMENT

Figure 1:
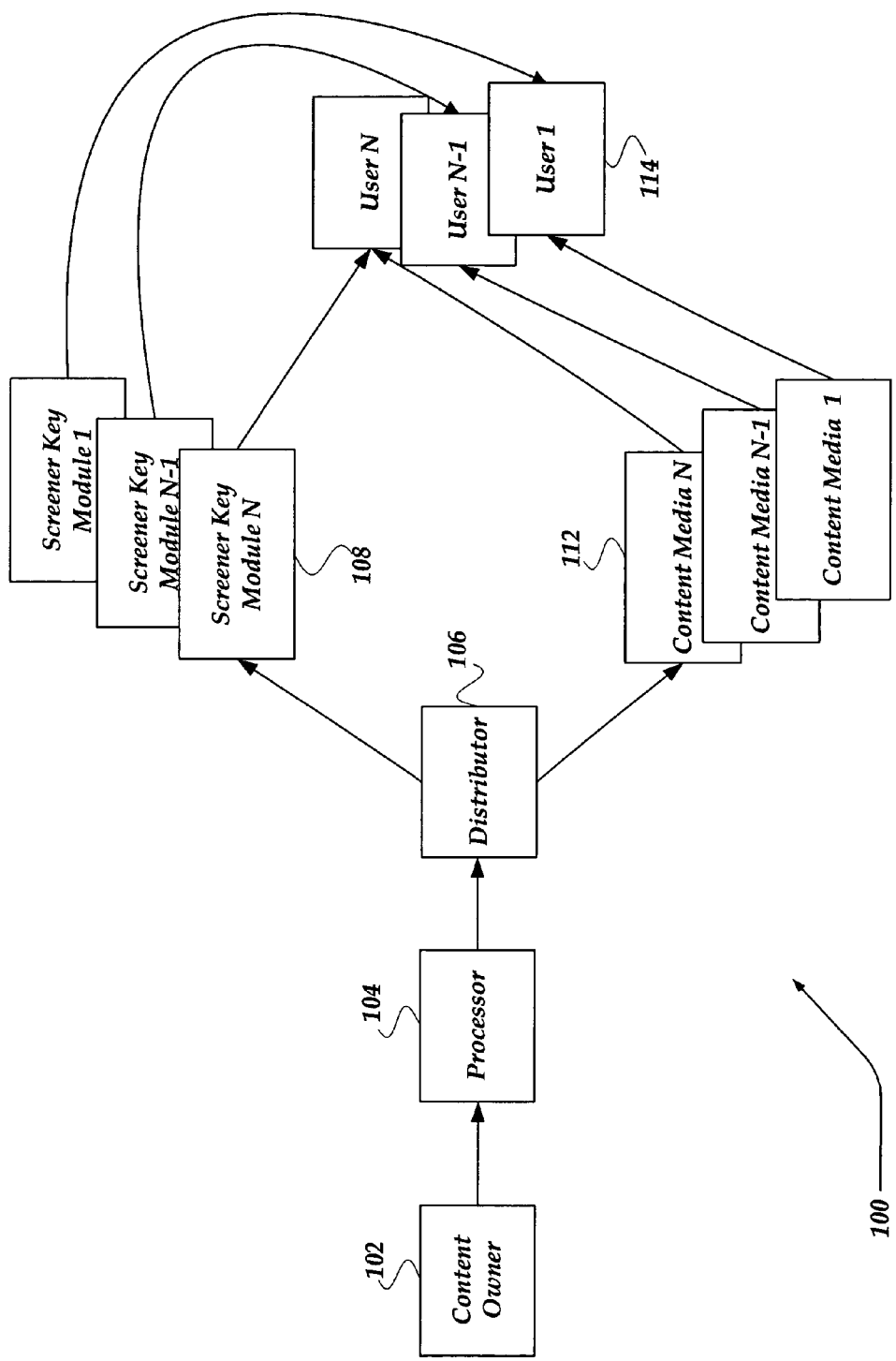
FIG. 1 illustrates an exemplary environment in which the present invention may be practiced.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise.

The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

The terms "coupled," and "connected," includes a direct connection between the things that are connected, or an indirect connection through one or more either passive or active intermediary devices or components.

The term "screener," includes media content, or the like, that is to be viewed/screened, and otherwise enjoyed by a user, member of an awards organization, or the like. The term "screener" may also include a content medium, such as a DVD, high definition formatted DVD (HD DVD®), Compact Discs (CDs), Video Compact Disc (VCD), Super VCD (SVCD), Super Audio CD (SACD), Dynamic Digital Sound (DDS), Read/Write DVD, CD-Recordable (CD-R), BLU-RAY DISCS®, or the like, that may be employed to transport the content.

The meaning of "a," "an," and "the" include plural references. The meaning of "in" includes "in" and "on."

Briefly stated, the present invention is directed to a system, apparatus, and method for securely providing secure content viewable on a secure player by a selected user. In one embodiment, the secure player provides secure screening/previewing of secure content, such as a motion picture, by a member of an awards organization.

In one embodiment, a content key is employed to selectively encrypt at least a portion of a content stream. In one embodiment, the content stream may also be selectively watermarked. The content key is encrypted with a screener key. The encrypted content key is embedded into the secure content. The screener key is encrypted using a public/private key pair that is bound to the secure player. The secure content may be distributed on a medium, such as a DVD, High Definition (HD DVD®), a portable memory device, a BLU-RAY DISC®, over a network, through a cellular telephone, or the like. The secure player is configured to receive the medium, screener key, and an identity. The identity and screener key are employed by the secure player to decrypt and enable secure viewing of the content. In one embodiment, the identity is an identity associated with the screener. In one embodiment, the identity may reside on a module that may include a fingerprint associated with the secure player. In one embodiment, the fingerprint may be employed to confirm that the identity module and/or identity are associated with the secure player. The screener key may be provided over a network, through a smart card, including a virtual smart card, or other portable memory device. In one embodiment, the screener key may be delivered over a network to a cellular telephone.

Illustrative Environment

FIG. 1 is a functional block diagram illustrating an exemplary operating environment 100 in which the invention may be implemented. Operating environment 100 is only one example of a suitable operating environment and is not intended to suggest any limitation as to the scope of use or functionality of the present invention. Thus, other well-known environments and configurations may be employed without departing from the scope or spirit of the present invention.

As shown in the figure, operating environment 100 includes content owner 102, processor 104, distributor 106, screener key module(s) 108 (1 through N), content medium 112 (1 through N), and user(s) 114 (1 through N). Processor 104 is in communication with content owner 102 and distributor 106. Distributor 106 is also in communication with screener key module(s) 108 (1 through N) and content medium 112 (1 through N). User(s) 114 (1 through N) are also in communication with screener key module(s) 108 (1 through N) and content medium 112 (1 through N).

Content owner 102 includes producers, developers, and owners of media content that can be distributed to user(s) 114. Such content, sometimes called screeners, includes motion pictures, movies, videos, or the like. However, content owned by content owner 102 is not limited to video content only, and may include audio only services, without departing from the scope or spirit of the present invention. Thus, content is intended to include, but is not limited to, audio, video, still images, text, graphics, and other forms of content (screeners) directed towards user(s) 114.

Processor 104 receives content from content owner 102, and may selectively secure at least a portion of that content, and provide the secured content to distributor 106, as described in more detail below in conjunction with FIG. 5. Briefly, however, processor 104 creates and embeds in a stream of the received content, selected information, such as a content key for decryption, a content identifier, access constraints, rights, entitlements, or the like. In one embodiment, the selected information is packaged into at least one key package (not shown), each of which is encrypted employing at least one screener key. In another embodiment, each content key is encrypted employing at least one screener key. In one embodiment, the content identifier may be left in the clear.

The screener key(s) may be generated using any of a variety of encryption/decryption key mechanisms, including, but not limited to RSA algorithms, Data Encryption Standard (DES), International Data Encryption Algorithm (IDEA), Skipjack, RC4, Advanced Encryption Standard (AES), Elliptic Curve Cryptography, or the like. In one embodiment, the screener key(s) employ a 256-bit AES algorithm for the encryption/decryption of the key package. Thus, screener key(s) may be based on symmetric key mechanisms and/or asymmetric key mechanisms.

Processor 104 may obtain the screener key(s) and content key(s) from a variety of sources, including, but not limited to, content owner 102, a trusted third party, or the like. Processor 104 may also generate the screener key(s) and/or content key(s) itself. Moreover, the screener keys may reside within a key storage (not shown). Each screener key may be indexed in the key storage by a content identifier that is associated with particular content. The key storage may further include access constraints, rights, entitlements, or the like, associated with a user, content, a targeted secure player, any combination of user, content, and targeted secure player, or the like.

Distributor 106 includes businesses, systems, or the like that obtain rights from content owner 102 to copy and distribute the secure content. Distributor 106 may obtain the rights to copy and distribute from one or more content owners. Distributor 106 may repackage, store, and schedule secure content for subsequent sale, distribution, and license to other distributors, user(s) 114, or the like, using content medium 112.

Distributor 106 may copy the secure content onto a variety of content medium 112, including, but not limited to a DVD, HD DVD®, Video Compact Disc (VCD), Super VCD (SVCD), Super Audio CD (SACD), or the like. For example, secure content may be copied and distributed on a Dynamic Digital Sound (DDS). Moreover, distributor 106 may also copy and distribute secure content on a Read/Write DVD, CD-Recordable (CD-R), a portable memory device, such as a USB content storage device, memory cards, or the like, or substantially similar content medium mechanisms. Thus, content medium 112 may represent virtually any other content medium technology that may be employed to transport content from one location to another. For example, content medium 112 may also include a network, a cellular telephone, or the like, without departing from the scope or spirit of the invention.

Distributor 106 may receive one or more screener keys associated with the one or more key packages. Distributor 106 may also receive authorization information from a variety of trusted sources that indicate whether a user has authorization to access the secure content. Provided that the user does have authorization, distributor 106 may package the received screener key(s) into screener key module 108. Distributor 106 may also include in screener key module 108 a content identifier associated with the secure content, fulfillment rights, access constraints, entitlements, attributes associated with a targeted secure player, or the like. For example, distributor 106 may include in screener key module 108 attributes that indicate that the secure content is not playable within a selected geographic region.

Distributor 106 may further encrypt the screener key(s), and additional information included on screener key module 108, with a public key associated with the targeted secure player. The targeted secure player's public key may be generated employing any of a variety of asymmetric encryption mechanisms, including, but not limited to RSA, Merkle-Hellman, PGP, X.509, Elliptic Curve Cryptography, or the like.

In one embodiment, distributor 106 employs a 2048-bit RSA asymmetric (public/private) key associated with the targeted secure player to encrypt the screener key(s). In another embodiment, the public/private key pair associated with the targeted secure player is generated in a Federal Information Processing Standard (FIPS) level 4 device. However, the present invention is not so limited, and another security level may be employed to generate the targeted secure player's public/private key pair.

In any event, the targeted secure player's public key may be made available to distributor 106 through a variety of approaches, including a trusted third party, a network, email, portable memory device, a smart card, including a virtual smart card, or the like. Moreover, the targeted secure player's private/public keys are bound to the targeted secure player such that they are unique to that particular targeted secure player. Moreover, the targeted secure player is configured to prevent removal of the targeted secure player's private key. Such action further binds the targeted secure player's private key to the targeted secure player.

Distributor 106 may distribute screener key module 108 to user(s) 114 employing any of a variety of mechanisms, including, but not limited to, a smart card, including a virtual smart card, a PCMCIA card, a memory stick, a USB device, a portable memory device, a network, a DVD, HD-DVD, VCD, SVCD, a CD, tape, floppy disc, or other similar removable mechanisms. Screener key module 108 may also be mailed to user(s) 114, provided over a cellular phone, or the like.

Briefly, a virtual smart card (VSC) includes computer-executable code static data, and the like, that is configured to enable content protection similar to physical smart card approaches. However, unlike the physical smart card approaches, the VSC is configured as software that may be downloaded to enable changes in security solutions to be implemented rapidly (in seconds, minutes, or hours) at relatively low costs. This is in stark contrast to physical smart card approaches that often require new hardware to be generated and distributed. Such physical approaches typically are made available as updates about once or twice a year.

Typical the VSC may include various components (not shown) including, secure stores, fingerprinting modules, secure message managers, entitlement manages, key generators, digital copy protection engines, and the like. The VSC may be configured to enable protection of received content in part by managing receipt of and security for screener keys, or the like. In another embodiment, the VSC may receive the screener key from another device, over a network, or the like.

User(s) 114 include end-users, consumers of content, or the like. User(s) 114 further include members of an awards organization, or the like, that receive content (screeners) for review. User(s) 114 may employ various devices to enjoy the content, including but not limited to television appliances, mobile device, PDAs, personal computers, jukeboxes, or the like. User(s) 114 may further employ the secure player described in more detail below in conjunction with FIG. 2 to securely provide the content to the above devices.

User(s) 114 may request content medium 112 directly from content owner 102, or at any point along a market stream (e.g., from distributor 106). Moreover, user(s) 114 may receive content medium 112 through multiple content owners 102, distributors 106, or the like. User(s) 114 may further receive screener key module(s) 108 from content owner 102, distributor 106, or the like. User(s) 114 may also receive an identity module, described below in conjunction with FIG. 2 that may include user authentication and authorization for access to the secure content, a fingerprint associated with a secure player, or the like. User(s) 114 may employ screener key module(s) 108, and the identity module, to view the secure content on content medium 112. In one embodiment, the fingerprint may be used to confirm that the identity module and/or the user authentication are properly associated with the secure player.

Figure 2:
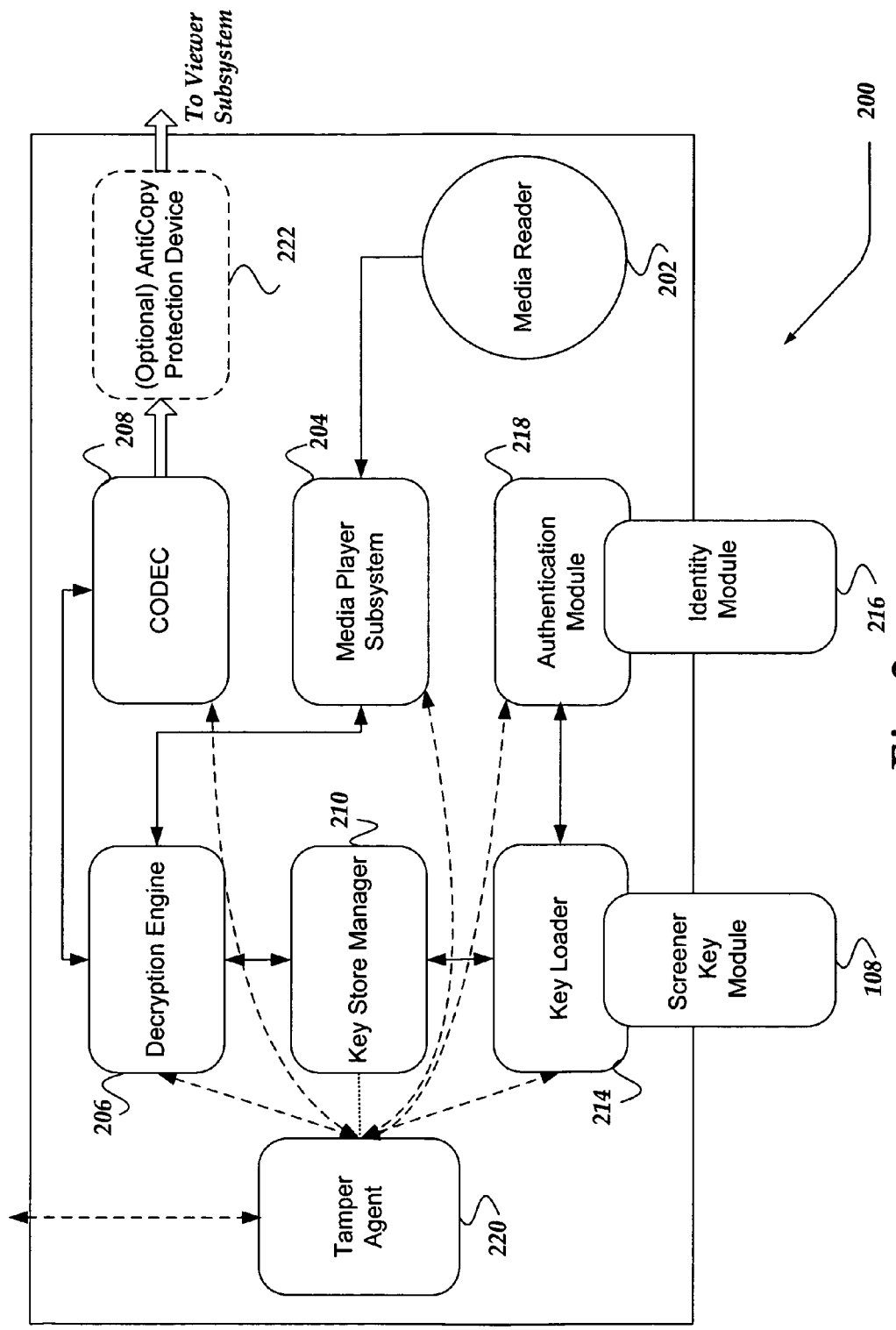
FIG. 2 illustrates a block diagram of an exemplary apparatus for enabling the viewing of secure content.

FIG. 2 illustrates a block diagram of an exemplary apparatus for enabling the viewing of secure content. Briefly, secure player 200 is configured to receive content medium 112 and screener key module 108 of FIG. 1, and an identity module, and to enable viewing of the secure content on content medium 112. As such, secure player 200 may be employed by user(s) 114 within, or coupled to a television appliance, digital recorder, set-top-box, cellular phone, mobile device, PDA, personal computer, jukebox, hybrid Internet-music-player/home-stereo-component-system, in communication with a network, or the like.

As shown in FIG. 2, secure player 200 may include many more components than those shown; however, those shown are sufficient to disclose an illustrative embodiment for practicing the invention.

As shown in the figure, secure player 200 includes media reader 202, media player subsystem 204, decryption engine 206, COmpresser/DECompresser (CODEC) 208, key store/manager 210, screener key module 108, key loader 214, identity module 216, authentication module 218, tamper agent 220, and (optional) anticopy protection device 222. Components numbered similarly to those in FIG. 1 operate in a substantially similar manner.

Media player subsystem 204 is in communication with media reader 202 and decryption engine 206. Decryption engine 206 is also in communication with CODEC 208 and key store/manager 210. CODEC 208 is in communication with optional anticopy protection device 222. Key store/manager 210 is further in communication with key loader 214. Key loader 214 is in communication with screener key module 108 and authentication module 218. Authentication module 218 is also in communication with identity module 216. Tamper agent 220 is in communication with decryption engine 206, CODEC 208, key store/manager 210, media player subsystem 204, authentication module 218, and key loader 214.

Media reader 202 includes virtually any device and related software that is configured to receive content medium 112 of FIG. 1. Such devices include, but are not limited to, a DVD drive, high definition DVD drive, Super Video CD (SVCD) drive, VCD drive, Super Audio CD (SACD) drive, and other content devices. For example, media reader 202 may also be Dynamic Digital Sound (DDS) drive. Moreover, media reader 202 may also support write capabilities, such as through a DVD/RW drive, or the like. Media reader 202 and media player subsystem 204 however, are not limited to DVD, and CD technologies and virtually any other content medium technology may be employed without departing from the scope of spirit of the present invention. For example, media reader 202 may also include network interface cards, software, or the like, useable to receive network packets over a network, including a wireless or wired network, or the like. Moreover media reader 202 may also receive content from a portable memory device such as USB content storage device, a memory card, a cellular telephone, portable music device, a tape, a floppy disc, or the like.

Media player subsystem 204 operates in conjunction with media reader 202 to take secure content from the content medium supported by media reader 202, and provide it to decryption engine 206. Moreover, media player subsystem 204 and media reader 202 may include the capabilities to enable the content medium to be erased, destroyed, written over, or the like. For example, media player subsystem 204 may enable the erasure, destruction, disablement, or the like, of the secure content on the content medium after a predetermined number of viewings, e.g. a single viewing, indication of unauthorized activity, or the like.

CODEC 208 includes any of a variety of compression/decompression mechanisms configured to receive compressed content and decompress it into a format capable of being rendered for the user's enjoyment. For example, CODEC 208 may employ Moving Pictures Experts Group (MPEG), Joint Photographic Experts Group (JPEG), wavelets, and other mechanisms for compression and decompression of received content.

Key loader 214 is enabled to receive a request to retrieve a screener key from screener key module 108. Key loader 214 may evaluate the request to determine whether the user has sufficient authorization to retrieve the screener key. Key loader 214 may request such authorization from authentication module 218. Key loader 214 may provide authentication module 218 a content identifier, or other information as part of its request for authorization. Additionally, key loader 214 may receive a request to load one or more screener keys, and other information, onto screener key module 108. Again, key loader 214 may seek authorization for such action from authentication module 218.

Authentication module 218 is configured to authenticate a user and to provide authorized access to screener key module 108. Authentication module 218 may receive a request from key loader 214 to access a screener key residing on screener key module 108. Authentication module 218 may also receive a request to store information on screener key module 108. In any event, authentication module 218 employs identity module 216 to determine the user's identity and associated authorization for access to screener key module 108.

In one embodiment, identity module 216 may also include a fingerprint or other identifier associated with secure player 200. Such fingerprints may be based on any of a variety of characteristics of secure player 200 including but not limited to a Central Processing Unit's (CPU's) kernel calculated speed, CPU serial number, CPU family identity, CPU manufacturer, an operating system globally unique identifier (GUID), a hardware component's enumerations, an Internet Protocol (IP) address associated with secure player 200, network address, a input/out characteristic, a BIOS serial number, a disk serial number, a kernel version number, operating system version number, operating system build number, machine name, an installed memory's characteristic, a physical port enumeration, customer supplied ID, MAC address, any combination of two or more of the proceeding characteristics, or like. Moreover, the fingerprint may employ any of a variety of hashing mechanisms including, but not limited to Message Digests (MD), Secure Hash Algorithms (SHA), or the like, using one or more of the characteristics of secure player 200. The fingerprint may be used, in one embodiment, to confirm that identity module 216, and/or user's identity is properly associated with secure player 200. In one embodiment, where the fingerprint indicates that identity module 216 is unassociated with secure player 200, access to screener key module 108, including an ability to decrypt content may be denied.

Identity module 216 is enabled to provide the identity of a user, a fingerprint associated with secure player 200, and entitlements and rights associated with a content identifier, user, or the like. Identity module 216 may be deployed using a variety of mechanisms, including, but not limited to, smart card, a portable memory device, a DVD, a CD, HD-DVD, SVCD, SACD, a USB content storage device, a memory card, a tape, a floppy disc, or the like. In one embodiment, identity module 216 may also be communicated over a network. In one embodiment, identity module 216 may be provided over a network to a cellular telephone, or other mobile device. In one embodiment, identity module 216 may be protected from access using any of a variety of security mechanisms, including, but not limited to biometrics, user-name/passwords, smart cards, touch-pads, secret keys, including public key encryption, private key encryption, Kerberos tickets, swipe cards, badges, or the like. In one embodiment, identity module 216 is configured to enable virtually any user of secure player 200 to be authenticated to virtually any secure content.

Key store/manager 210 is configured to store and manage encryption/decryption keys, including screener keys, secure player 200's public/private keys, associated information, or the like. The associated information may include entitlements, rights, or the like, associated with at least one of a screener key, user, content, any combination of screener key, user, and content, or the like. Key store/manager 210 may include a database or flat data file, or the like, configured to store and manage the keys and the associated information in a secure manner. Moreover, key store/manager 210 may be implemented on a hard disk, Random Access Memory (RAM), non-volatile memory such as flash memory, and/or any other memory architecture, CD-ROM, DVD, and/or any other optical storage, magnetic cassettes, magnetic tape, magnetic disk storage and/or any other magnetic storage devices, and/or any other medium that can store information that can be accessed by a computing device. In one embodiment, where key store/manager 210 is configured to store the private key, key store/manager 210 is configured to be non-removable. Key store/manager 210 may further employ content identifiers to index the screener keys and associated information stored within.

Key store/manager 210 typically securely retains the secure player 200's private/public keys until decryption engine 206 requests them for decryption/encryption of a screener key. Key store/manager 210, however, is configured to ensure that the secure player's private key is not made available beyond use within secure player 200.

Key store/manager 210 securely stores received screener keys until decryption engine 206 requests them for decryption of encrypted content. Key store/manager 210 may retrieve a screener key from screener key module 108 by making a request to key loader 214. Key store/manager 210 may also direct key loader 214 to deactivate screener key module 108 when a screener key has been retrieved from it. Key store/manager 210 may further direct key loader 214 to erase, or otherwise disable, a screener key on screener key module 108, based on an event, such as a pre-determined number of viewings of the associated secure content, unauthorized activity, or the like.

Key store/manager 210 may also employ secure player 200's public key to encrypt a screener key that is to be loaded onto screener key module 108.

Decryption engine 206 is configured to receive a stream of content units from media player subsystem 204. Upon receipt of at least one content unit, decryption engine 206 may make a determination whether the content unit is encrypted. Where a content unit is encrypted, decryption engine 206 may extract one or more key packages from the content stream. Decryption engine 206 may request a screener key from key store/manager 210 to decrypt the key package to, in turn, enable the extraction of one or more content keys associated with the encrypted content unit. Decryption engine 206 employs the one or more content keys to decrypt the encrypted content unit. Decryption engine 206 may further provide the decrypted content unit to CODEC 208.

(Optional) anticopy protection device 222 enables additional protections of decompressed content by scrambling, dirtying, and otherwise encrypting the decompressed content prior to providing it to a descrambler device, or the like. As such anticopy protection device 222 enables a level of protection of the content after it leaves secure player 200.

Tamper agent 220 is enabled to monitor the components in secure player 200, to determine whether any component, including secure player 200, itself, is being tampered with, or otherwise associated with an unauthorized activity. In one embodiment, tamper detection & response protection device 220 operates at least at a FIPS security level 3.

Tamper agent 220 may provide a response based on the results of its monitoring. Such responses may include directing the erasing or otherwise disabling the secure content, locking secure player 200 from an operation, erasing of secure player's public/private keys, screener keys, content keys, or the like, and reporting the detected unauthorized activity.

Figure 3:
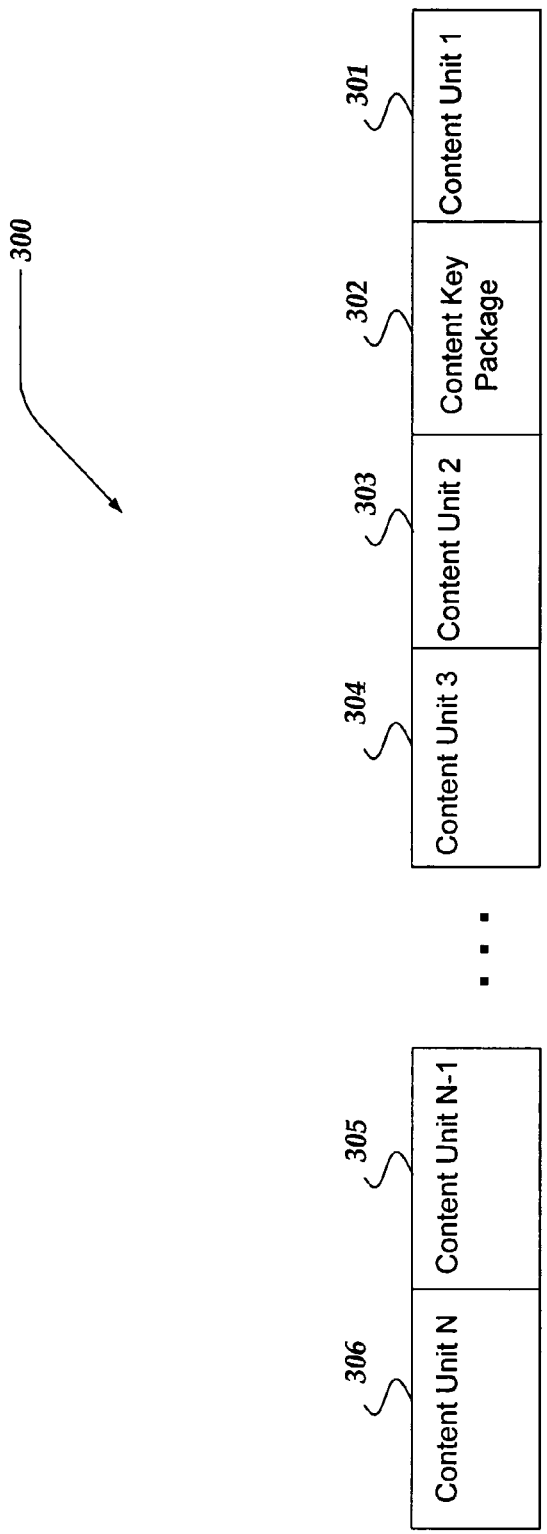
FIG. 3 illustrates one embodiment of a content stream for providing secure content.

FIG. 3 illustrates one embodiment of a content stream for providing secure content. Content stream 300 is only one example of a suitable stream of content and is not intended to suggest any limitation as to the scope of use or functionality of the present invention. Thus, other well-known structures and configurations may be employed without departing from the scope of the present invention.

As shown in the figure, content unit stream 300 includes content units 301, 303-306, and key package 302. Although, only one key package (302) is illustrated, it is noted that content stream 300 may include virtually any number of key packages.

Content units 301, and 303-306 may include a variety of content formats. For example, content may be formatted employing Motion Pictures Expert Group (MPEG) format. Content units 301, and 303-306 are not limited to MPEG content formats, and other content formats, including JPEG formats, MP3 formats, or the like, may be employed without departing from scope or spirit of the present invention. However, the MPEG format is employed herein as an example and for ease of illustration.

Briefly, MPEG is an encoding and compression standard for digital broadcast content. MPEG provides compression support for television quality transmission of video broadcast content. Moreover, MPEG provides for compressed audio, control, and even user broadcast content.

MPEG content streams include packetized elementary streams (PES), which typically include fixed (or variable sized) blocks or frames of an integral number of elementary streams (ES) access units. An ES typically is a basic component of an MPEG content stream, and includes digital control data, digital audio, digital video, and other digital content (synchronous or asynchronous). A group of tightly coupled PES packets referenced to substantially the same time base comprises an MPEG program stream (PS). Each PES packet also may be broken into fixed-sized transport packet known as MPEG Transport Streams (TS) that form a general-purpose approach of combining one or more content streams, possible including independent time bases. Moreover, MPEG frames include intra-frames (I-frames), forward predicted frames (P-frames), and bi-directional predicted frames (B-frames).

Content units 301, and 303-306 each may include a portion of the content stream that is partitioned into units of data based on a variety of criteria. For example, content units 301, and 303-306 may include portions of data extracted from the video elementary stream (ES), the audio ES, the digital data ES, and any combination of video, audio, data elementary streams of the content stream. For example, content units 301, and 303-306 may be composed of ten second portions of a video ES. Moreover, content units 301, and 303-306 need not include the same length, density, or the like, of content from the content stream.

Content units 301, and 303-306 may be selectively encrypted using one or more content keys. That is, content units 301 and 303 may be encrypted, while content units 304-306 are left in the clear. Additionally, encryption may be selectively applied to at least a portion of the video elementary stream (ES), the audio ES, the digital data ES, and any combination and any portion of video, audio, data elementary streams that comprise content stream 300. Selective encryption may further include selectively encrypting at least a portion of an I-frame, P-frame, B-frame, and any combination of P, B, and I frames.

Key package 302 may include one or more content keys used to encrypt content units, and a content identifier associated with a content stream 300. The key package 302 may also include access constraints, entitlements, or the like, associated with content stream 300. Key package 302 may further include synchronization information that indicates which content key is associated with which content unit (301, 302-306) of content stream 300.

Key package 302 may be encrypted employing a targeted secure player's public/private key. In one embodiment, the targeted secure player's public/private keys are generated in a FIPS level 4 device. However, the present invention is not so limited, and lower security levels may be employed to generate the target secure player's public/private keys. In one embodiment, key package 302 is left in the clear, and only the content key(s) are encrypted with the targeted secure player's public/private key.

Generalized Operation

The operation of certain aspects of the present invention will now be described with respect to FIGS. 4-6.

Figure 4:
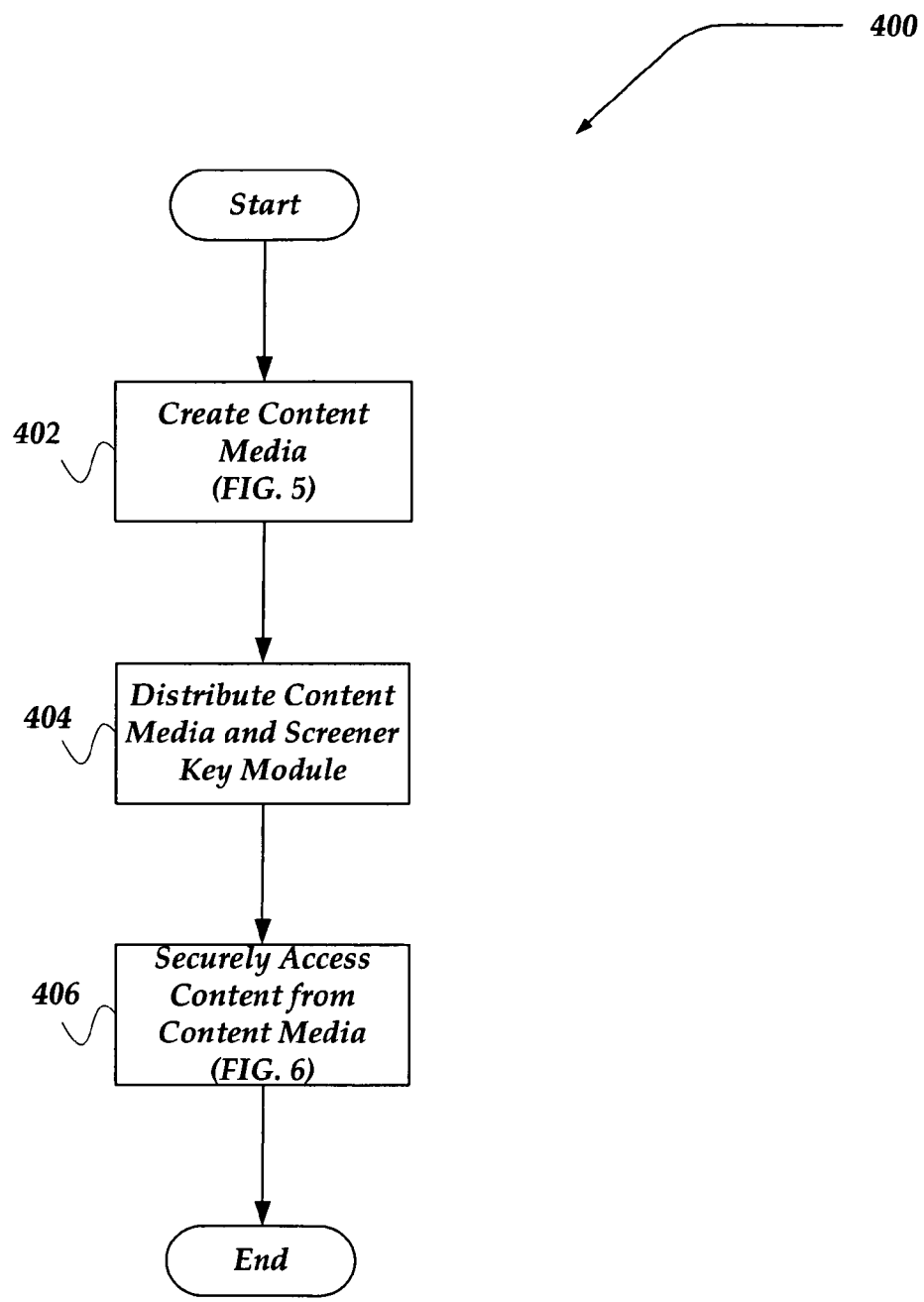
FIG. 4 illustrates a flow diagram generally showing one embodiment for an end-to-end process of providing and viewing secure content.

FIG. 4 illustrates a flow diagram generally showing one embodiment for an end-to-end process of providing and viewing secure content. Process 400 may operate, for example, within operating environment 100 in FIG. 1.

Process 400 begins, after a start block, at block 402. Block 402 is described in more detail below in conjunction with FIG. 5. Briefly, however, at block 402 secure content is created, by selectively encrypting at least one content unit within a content stream. The selective content unit is encrypted employing at least one content key. The employed content key(s), along with additional information, may be further encrypted and embedded within the content stream. In one embodiment, the content unit may be selectively watermarked. The modified content stream is transferred to a content medium, such as content medium 112 in FIG. 1.

Processing proceeds to block 404 where the content and the key package are distributed to a user, such as user(s) 114 in FIG. 1. The content medium may be distributed employing a variety of mechanisms, including mail, or the like. The screener key module may include a memory stick, a smart card, a virtual smart card, a DVD, disk, tape, a file, a portable memory device such as a USB memory device, or the like. The screener key module may be distributed to the user through a different distribution mechanism than employed for the content. The screener key module may be distributed, for example, by employing the hard media described above, or by transmission over a network, by mail, and by a variety of other distribution mechanisms.

Processing continues to block 406, which is described in more detail below in conjunction with FIG. 6. Briefly, however, at block 406, a secure player, together with the screener key module and an identity module are employed to decrypt and view the content stream located on the content. Upon completion of the actions at block 406, processing returns to processing other actions.

Figure 5:
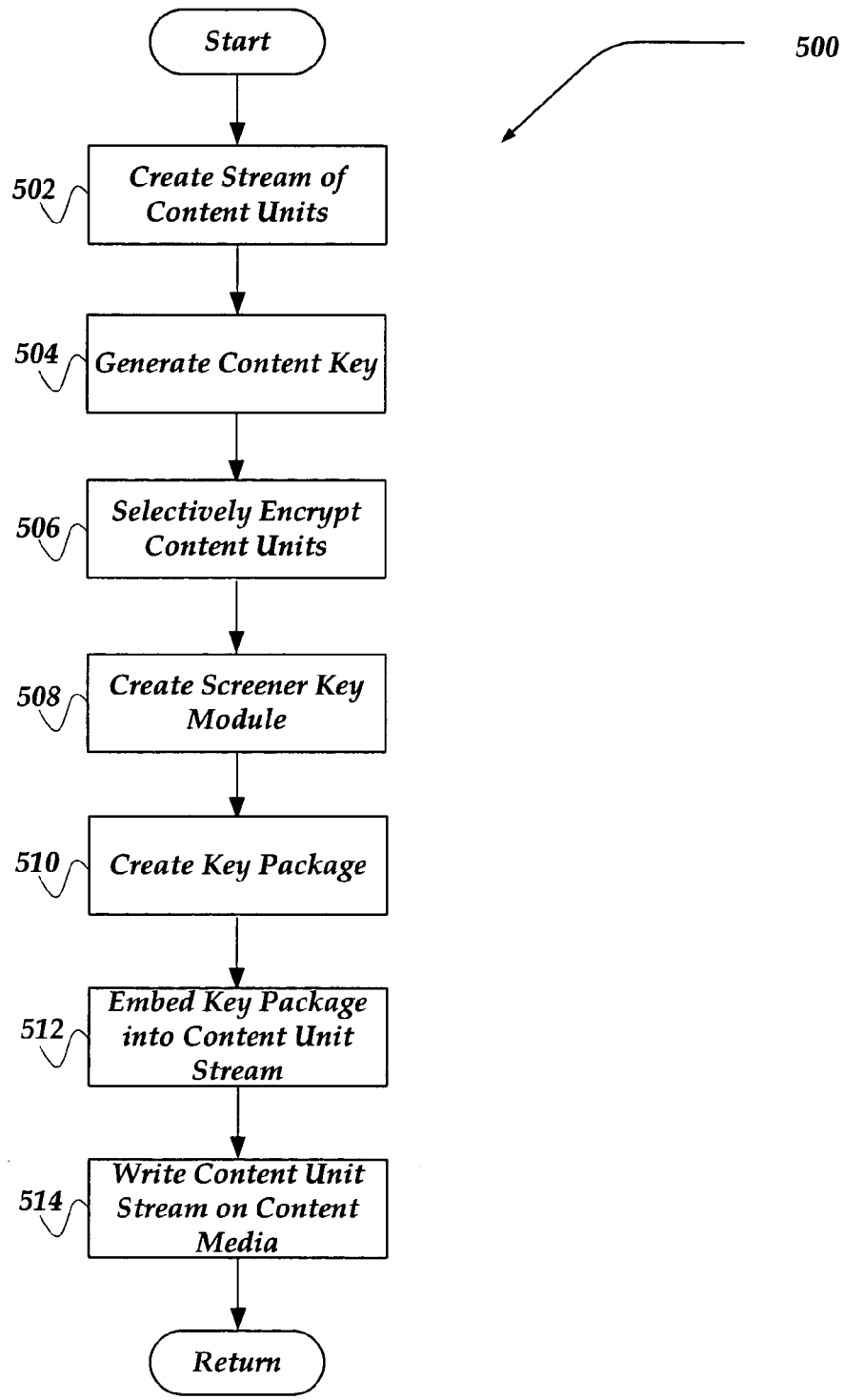
FIG. 5 illustrates a flow diagram generally showing one embodiment for a process of generating secure content.

FIG. 5 illustrates a flow diagram generally showing one embodiment for a process of generating secure content. Process 500 may operate, for example, within operating environment 100 in FIG. 1.

Process 500 begins, after a start block, at block 502, where a stream of content units is created. A content owner, producer, or the like, may create the stream of content units, by subdividing a content stream into units of data based on a variety of criteria, as described above in conjunction with FIG. 3.

Moreover, in one embodiment, the content stream may also be watermarked. Watermarking of the content stream may be selectively performed at block 502, although the content stream may also be watermarked at another block within process 500, without departing from the scope or spirit of the invention.

Briefly, a watermark as used herein is a digital signal or pattern that is inserted into the content. Because the inserted digital signal or pattern is not present in unaltered copies of the original content, the digital watermark may serve as a type of digital signature for the content. For example, watermarking may be employed to embed copyright notices into the content. A given watermark may be unique to each content so as to identify an intended recipient, or be common to multiple copies of the content such that the source may be identified. Moreover, a watermark may be invisible to a casual observer, further facilitating the claim of ownership, receipt of copyright revenues, or the success of prosecution for unauthorized use of the data file.

Any of a variety of watermarking mechanisms may be employed to insert one or more watermarks within the content, including but not limited to mechanisms that generates substitute portions of the content for replacement into the content stream, mechanisms that provide dynamic media data modifications, dark frame replacement mechanisms, watermarking of specific audio components, and/or video components, modifying metadata of the content with unique identification information, deliberate dropping of frames in a pattern as a watermark, inserting of invisible or inaudible watermarked data frames within the content stream, appending typically unused data to a content stream frame, packet, or the like. In one embodiment, the watermark may include various information such as a user identity, a fingerprint associated with the targeted secure player, a time and/or date stamp associated with an event such as decryption of the content, or the like. In one embodiment, the watermark may be digitally signed.

Processing proceeds to block 504, where at least one content key is generated. A content key may be generated employing any of a number of encryption/decryption symmetric mechanisms, including, but not limited to Advanced Encryption Standard (AES), RSA, RC6, IDEA, DES, RC2, RC5, Skipjack, and any other symmetric encryption algorithm. Moreover, such encryption algorithms may use, where appropriate, cipher block chaining mode, cipher feedback mode, CBC cipher text stealing (CTS), CFB, OFB, counter mode, and/or any other block mode. In one embodiment, content keys are generated employing an at least 128 bit AES encryption/decryption algorithm. However, content key generation is not limited to symmetric key mechanisms, and asymmetric key mechanisms may also be employed without departing from the scope of the present invention.

Processing continues to block 506, where at least one content key is employed to selectively encrypt a content unit in the content stream. Selective encryption may include selecting a content unit at random in the content stream for encryption, selecting every N/th content unit in the content stream, or the like. Selective encryption may also include selectively encrypting at least a portion of the content unit, such as at least a portion the video elementary stream (ES), the audio ES, the digital data ES, and any combination of video, audio, data elementary streams in the content unit. Selective encryption may further include encrypting a frame in the content unit, such as the I-frame, P-frame, B-frame, and any combination of P, B, and I frames of the content unit, while leaving one or more other frames, or portions of the content stream un-encrypted Moreover, selective encryption may further include varying the content key employed to encrypt selected content units. For example, in one embodiment, a set of content keys is rotated through on some basis, such as every ten seconds, to encrypt the content units.

Processing next proceeds to block 508, where a screener key module is created. The screener key module may include a content identifier associated with the content and a screener key. The screener key module may also include entitlements, rights or the like associated with the content. Moreover, the screener key may be encrypted employing a public/private key that is bound to the targeted secure player.

Processing continues to block 510, where a key package is created. The key package may include at least one content key, a content identifier associated with the content, access constraints, entitlements, or the like, substantially as described above in conjunction with FIG. 3. In one embodiment, the at least one content key is encrypted using the screener key. In another embodiment, the key package is encrypted. In still another embodiment, the content identifier associated with the content remains unencrypted.

Processing continues to block 512, where the key package is embedded into the content unit stream. Processing proceeds to block 514, where the modified content units are written to content, such as a DVD, high definition DVD, or the like. Upon completion of block 514, processing returns to perform other actions.

It is understood that several blocks of FIG. 5 can be implemented in a different sequence, combination of sequences, or the like, without departing from the scope or spirit of the present invention. For example, block 506 may be performed prior to, or even in combination with, block 504.

Figure 6A:
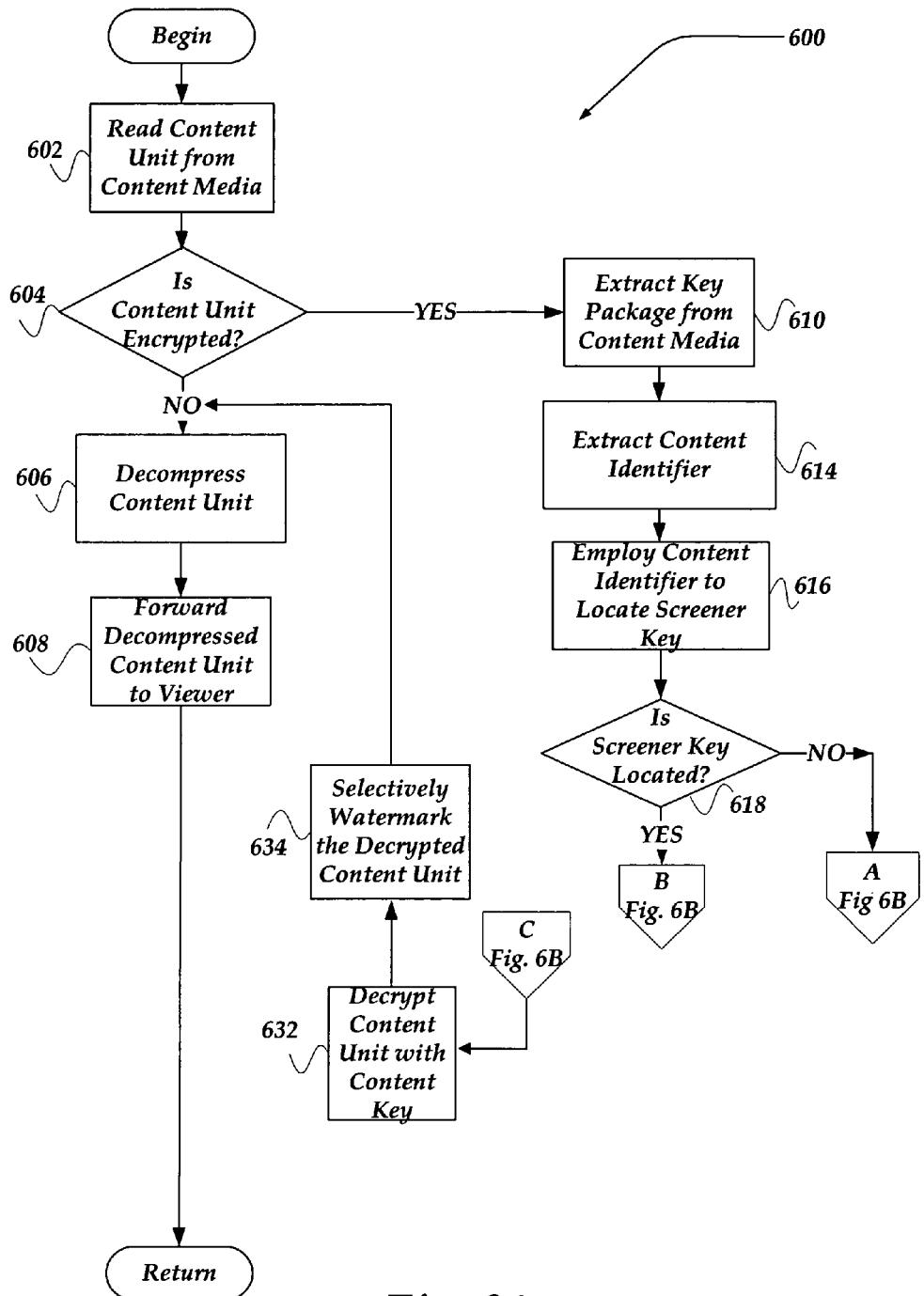
FIGS. 6A-6B illustrate a flow diagram generally showing one embodiment for a process of viewing secure content, in accordance with the present invention.
Figure 6B:
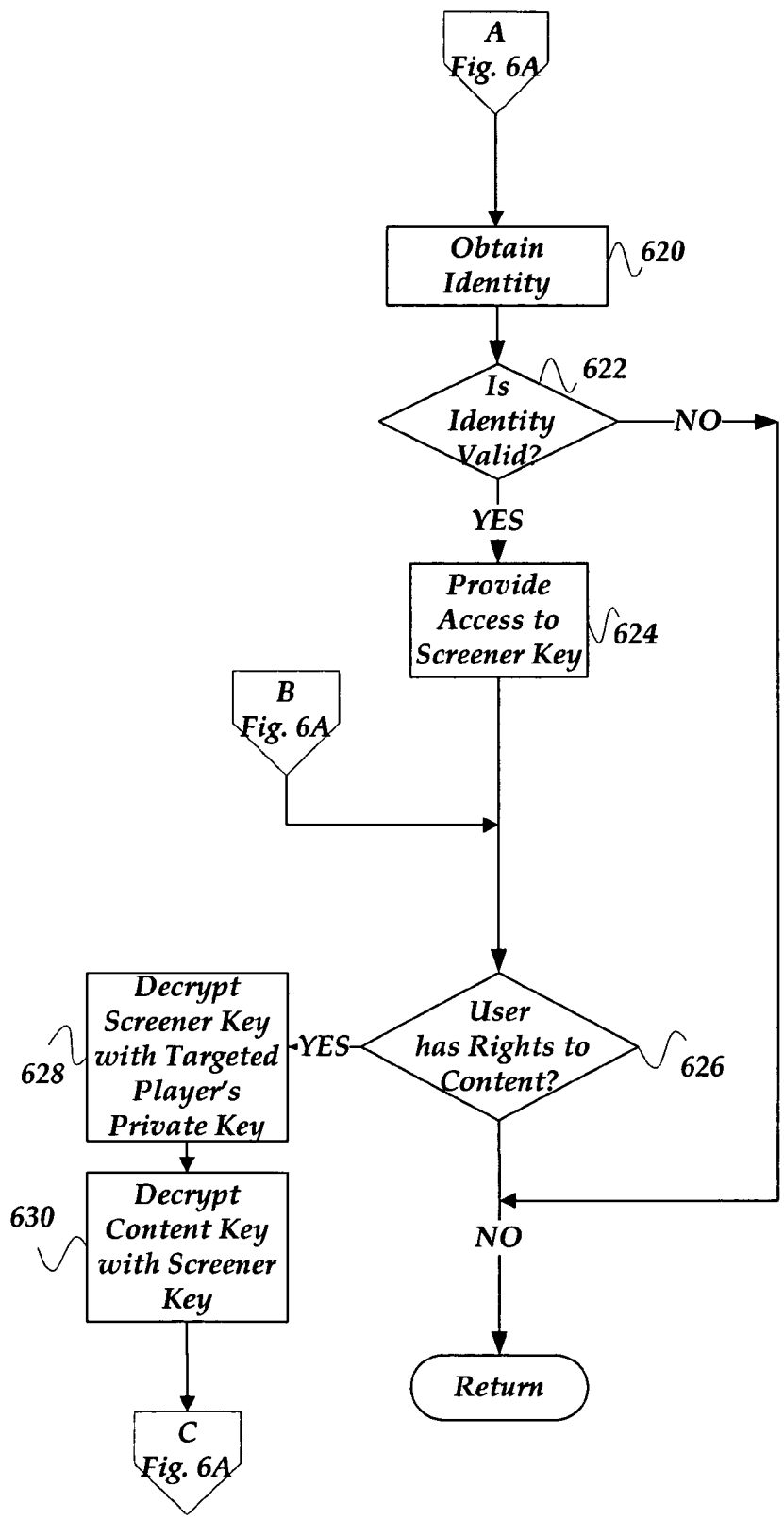

FIGS. 6A-6B illustrate a flow diagram generally showing one embodiment for a process of viewing secure content. Process 600 may operate, for example, within secure player 200 of FIG. 2.

Process 600 begins, after a start block, at block 602, where a content unit is read from content. Processing proceeds to decision block 604, where a determination is made whether the read content unit is encrypted. If it is determined that the read content unit is encrypted, processing branches to block 610; otherwise, processing branches to block 606.

At block 610, a key package is extracted from the content stream on the content. Processing continues to block 614, where a content identifier is extracted from the key package. In one embodiment, the content identifier is already "in the clear." Processing proceeds to block 616, where the content identifier is employed as an index to locate a screener key associated with the secure content.

Processing continues to decision block 618, where a determination is made whether a screener key associated with the content identifier is located in an existing database, file, directory, or the like, of existing screener keys. If a screener key is not located, processing branches to block 620; otherwise, processing branches to decision block 626.

At block 620, a request is made to obtain an identity for authorizing access to a screener key module. The request may require entering a user name/password, a biometric entry, or the like. In one embodiment, the request may require the user to insert a smart card that includes an identification key. In one embodiment, the identity may include a fingerprint that is unique to the secure player. In another embodiment, the identity may include a user identity. In still another embodiment, the identity may include a combination of the user identity and the fingerprint associated with the secure player. Processing continues to decision block 622, where a determination is made whether the received identity is valid. If the received identity is valid, processing branches to block 624; otherwise, processing returns to perform other actions. In one embodiment, such other actions, may include, but is not limited to, enabling the user to attempt to re-enter a valid identity, erasing the content, locking the user from access of the content, or the like.

At block 624, the valid identity is employed to enable access to the screener key located on a screener key module. Processing continues to decision block 626.

At decision block 626, a determination is made whether the validated user has appropriate access rights, entitlements, or the like, to the content unit. If so, processing branches to block 628; otherwise, processing returns to perform other actions, such as described above, at decision block 622.

At block 628, the screener key is decrypted using the private key that is bound to the targeted secure player. Processing continues to block 630, where the decrypted screener key is employed to decrypt the content key. In one embodiment, the decrypted screener key is employed to decrypt the key package and extract the content key. Processing continues to block 632, where the decrypted content key is employed to decrypt the encrypted content unit.

Processing next flows to block 634 where the decrypted content unit may be selectively watermarked. Selective watermarking involves watermarking one or more content units based on a rule, condition, event, or the like. For example, selective watermarking may include selecting a content unit at random in the content stream for watermarking, selecting every N/th content unit in the content stream for watermarking, or the like. Selective watermarking may also include selectively watermarking at least a portion of the content unit, such as at least a portion the video elementary stream (ES), the audio ES, the digital data ES, and any combination of video, audio, data elementary streams in the content unit. Selective watermarking may further include watermarking a frame in the content unit, such as the I-frame, P-frame, B-frame, and any combination of P, B, and I frames of the content unit. Moreover, the watermark may include information such as an identity of a user, a fingerprint associated with the secure player, a time and/or date of the decryption of the content unit, or the like. In one embodiment, the watermark may be digitally signed by the private key that is bound to the targeted secure player. Processing continues to block 606.

At block 606, a CODEC is employed to decompress the current content unit. In one embodiment, the decompressed content unit may also be selectively watermarked, as described above. Processing then proceeds to block 608, where the decompressed content is provided to a device, such as a television, or the like, for user enjoyment. In one embodiment, at block 608, the decompressed content is further copy protected. Thus, the decompressed content may be passed through an optional anticopy protection device, prior to forwarding the decompressed content. Upon completion of the actions at block 608, the process returns to performing other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A media content player for use in a playing secure content stream, the media content player comprising: a tamper agent that is configured to perform actions, including: monitoring each component within the media content player for tampering activity, including monitoring a media player subsystem, a key loader component, and a decryption engine; and the decryption engine in communication with tamper agent, and is configured to perform actions, including: receiving a selectively encrypted content stream, wherein a portion of the content is unencrypted, that is encrypted using a content key, the content key in turn is subsequently encrypted using a screener key, the screener key in turn being subsequently encrypted using a public key, the public key being associated with a private key, wherein the private key is bound to the media content player such that the public key and the private key are unique to the media content player; extracting an at least one key package from the selectively encrypted content stream; receiving the encrypted screener key using the private key; decrypting the content key using the screener key; and decrypting the selectively encrypted content stream using the content key, such that the decrypted content stream is playable to a user.

2. The media content player of claim 1, wherein receiving the selectively encrypted content stream further comprises receiving the selectively encrypted content stream over a network.

3. The media content player of claim 1, wherein the encrypted screener key is further configured for delivery over a network.

4. The media content player of claim 1, wherein the encrypted screener key is received via a virtual smart card.

5. The media content player of claim 1, wherein the selectively encrypted content stream further includes at least one watermark.

6. The media content player of claim 1, wherein the actions of the decryption engine further comprise:
   selectively watermarking at least a portion of the content stream.

7. The media content player of claim 6, wherein the selectively watermarking further comprises including at least one of a user identity, a fingerprint uniquely associated with the media content player, a time of decryption of at least a portion of the content stream, or a date of decryption of at least a portion of the content stream.

8. The media content player of claim 6, wherein the selectively watermarking further comprises digitally signing the selective watermark using the private key.

9. The media content player of claim 1, further comprising:
   an authentication module that is configured to receive an identity module, the identity module being configured to include at least one identifier useable to enable access to the encrypted screener key.

10. The media content player of claim 9, wherein the identity module further includes a fingerprint uniquely associated with the media content player.

11. The media content player of claim 9, wherein the identity module is configured to be received by the media content player over a network.

12. The media content player of claim 1, wherein the tamper agent is configured to perform actions, including: if tampering of the media content player or the content stream is detected, performing at least one action to inhibit access to the content stream.

13. The media content player of claim 12, wherein the at least one action, further comprises at least one of directing an erasure of at least a portion of the content stream, locking the media content player from an operation, erasing the media content player's public or private key, erasing the screener key, erasing the content key, or reporting the detected tampering.

14. The media content player of claim 1, further comprising: a media player subsystem that is in communication with the decryption engine and the tamper agent, and is configured to perform actions, including: inhibiting access to the selectively encrypted content stream based on at least one of a predetermined number of viewings, or an unauthorized activity.

15. The media content player of claim 1, further comprising:
   a key store that is configured to receive and to store at least one of the screener key, the public key, or the private key.

16. The media content player of claim 15, wherein the key store is implemented in non-volatile memory.

17. A computer-readable storage medium having computer-readable instructions useable in playing content, the computer-readable instructions being arranged to perform actions, including:
   receiving the content in a content stream;
   receiving a key package embedded within the content stream, the key package comprising at least one content key for decrypting at least one content unit associated with the content, the at least one content key being encrypted using a screener key, the screener key being subsequently encrypted using a public key bound to a targeted player such that the public key and an associated private key are unique to the targeted player, the at least one content unit being selectively encrypted and selectively watermarked;
   decrypting the screener key using the private key, the private key being bound to the targeted player;
   employing the screener key to decrypt the content key, the content key enabling decryption of the at least one content unit; and
   monitoring each component within the targeted player using a tamper detector, including the targeted player itself, for an unauthorized activity.

18. The computer-readable storage medium of claim 17, wherein the computer-readable instructions are arranged to perform actions, further comprising:
   selectively watermarking at least one decrypted content unit.

19. The computer-readable storage medium of claim 17, wherein receiving the key package further comprises receiving the key package-with the content.

20. The computer-readable storage medium of claim 17, the computer-readable instructions being arranged to perform actions, further comprising:
   determining a tampering of the targeted player or the content; and
   if tampering is detected, inhibiting access to the content.

21. The computer-readable storage medium of claim 17, the computer-readable instructions being arranged to perform actions, further comprising:
   receiving an identity module over the network, the identity module being configured to include at least one identifier useable to enable access to the encrypted screener key.

22. The computer-readable storage medium of claim 17, the computer-readable instructions being arranged to perform actions, further comprising:
   receiving the encrypted screener key using a virtual smart card.

23. The computer-readable storage medium of claim 17, the computer-readable instructions being arranged to perform actions, further comprising:
   receiving a fingerprint uniquely associated with the targeted player, the fingerprint enabling authentication for access to the content.

* * * * *